US006962965B2

(12) United States Patent
Yeager

(10) Patent No.: US 6,962,965 B2
(45) Date of Patent: Nov. 8, 2005

(54) FUNCTIONALIZED POLY(ARYLENE ETHER) COMPOSITION AND PROCESS

(75) Inventor: Gary William Yeager, Rexford, NY (US)

(73) Assignee: General Electric Company, Pittsfield, MA (US)

(*) Notice: Subject to any disclaimer, the term of this patent is extended or adjusted under 35 U.S.C. 154(b) by 49 days.

(21) Appl. No.: 10/783,212

(22) Filed: Feb. 20, 2004

(65) Prior Publication Data

US 2005/0187373 A1   Aug. 25, 2005

(51) Int. Cl.[7] ............................................. C08G 65/40
(52) U.S. Cl. ...................... 528/205; 525/391; 525/395; 525/534; 528/86; 528/176; 528/162; 528/192; 526/303.1; 526/313; 526/317.1; 526/319; 526/322; 526/346
(58) Field of Search .......................... 528/86, 162, 176, 528/192, 205; 525/391, 395, 534; 526/303.1, 526/313, 317.1, 319, 322, 346

(56) References Cited

U.S. PATENT DOCUMENTS

| | | | |
|---|---|---|---|
| 3,375,228 A | 3/1968 | Holoch et al. | |
| 3,375,298 A | * 3/1968 | Fox ............................ | 525/395 |
| 3,522,326 A | 7/1970 | Bostick et al. | |
| 4,148,843 A | 4/1979 | Goossens | |
| 4,562,243 A | 12/1985 | Percec | |
| 4,634,742 A | 1/1987 | Percec | |
| 4,663,402 A | 5/1987 | Percec et al. | |
| 4,665,137 A | 5/1987 | Percec | |
| 4,677,185 A | 6/1987 | Heitz et al. | |
| 4,701,514 A | 10/1987 | Percec | |
| H521 H | 9/1988 | Fan | |
| 4,806,601 A | 2/1989 | Percec | |
| 4,871,816 A | 10/1989 | Percec et al. | |
| 5,071,922 A | 12/1991 | Nelissen et al. | |
| 5,079,268 A | 1/1992 | Nelissen et al. | |
| 5,091,480 A | 2/1992 | Percec | |
| 5,171,761 A | 12/1992 | Penco et al. | |
| 5,218,030 A | 6/1993 | Katayose et al. | |
| 5,219,951 A | 6/1993 | Nelissen et al. | |
| 5,262,477 A | 11/1993 | Kasai et al. | |
| 5,272,233 A | 12/1993 | Crivello et al. | |
| 5,304,600 A | 4/1994 | Nelissen et al. | |
| 5,352,745 A | 10/1994 | Katayose et al. | |
| 5,407,972 A | 4/1995 | Smith et al. | |
| 5,554,677 A | 9/1996 | Nagaoka et al. | |
| 5,561,199 A | 10/1996 | Nagaoka et al. | |
| 5,965,663 A | 10/1999 | Hayase | |
| 6,051,662 A | * 4/2000 | Tracy et al. ................. | 525/393 |
| 6,306,963 B1 | 10/2001 | Lane et al. | |
| 6,352,782 B2 | 3/2002 | Yeager et al. | |
| 6,384,176 B1 | 5/2002 | Braat et al. | |
| 6,414,084 B1 | 7/2002 | Adedeji | |
| 6,469,124 B2 | 10/2002 | Braat et al. | |
| 6,521,703 B2 | 2/2003 | Zarnoch et al. | |
| 6,608,166 B2 | * 8/2003 | Guo et al. ................... | 528/205 |
| 6,617,398 B2 | 9/2003 | Yeager et al. | |
| 6,627,704 B2 | * 9/2003 | Yeager et al. ............... | 525/391 |
| 6,627,708 B2 | 9/2003 | Braat et al. | |
| 6,664,359 B1 | 12/2003 | Kangas et al. | |
| 6,812,276 B2 | * 11/2004 | Yeager ....................... | 524/495 |
| 2002/0028337 A1 | 3/2002 | Yeager et al. | |
| 2004/0132941 A1 | * 7/2004 | Ishii et al. .................. | 526/319 |

FOREIGN PATENT DOCUMENTS

| | | | |
|---|---|---|---|
| DE | 3117514 A1 | * | 12/1982 |
| EP | 0 261 574 | | 11/1991 |
| JP | 50-129698 A | * | 10/1975 |
| JP | 63-312351 A | * | 12/1988 |

OTHER PUBLICATIONS

Part 1, Chapter IV of Polyurethanes, J.H. Saunders and K. E. Fruch, Wiley-Interscience, New York, 1962 pp. 129-217.

* cited by examiner

Primary Examiner—Marc Zimmer

(57) ABSTRACT

A functionalized poly(arylene ether) having a pendant carbon—carbon double bond is prepared by reacting the hydroxy end group of a poly(arylene ether) with a polyisocyanate compound to produce a urethane-capped poly (arylene ether) having pendant isocyanate functionality, which is then reacted with a polyfunctional compound having a carbon—carbon double bond and a hydroxy, thiol, or amino group. The functionalized poly(arylene ether) is useful as a component of a curable composition in which its carbon—carbon double bond copolymerizes with one or more olefinically unsaturated comonomers.

32 Claims, No Drawings

FUNCTIONALIZED POLY(ARYLENE ETHER) COMPOSITION AND PROCESS

BACKGROUND

Poly(arylene ether)s capped with polymerizable carbon—carbon double bonds are useful components of thermoset compositions, contributing desirable combinations of stiffness, toughness, and heat resistance. Methods of preparing acrylate- or methacrylate-capped poly(arylene ether)s, as well as curable compositions containing them, have been described, for example in U.S. Pat. No. 6,627,704 B2 to Yeager et al. However, these materials are typically prepared by the reaction of a poly(arylene ether) with acrylic or methacrylic anhydride, and these anhydride reagents are relatively expensive, highly reactive, and generate an equivalent of (meth)acrylic acid that must be removed from the product. There is therefore a need for alternative reactive-capped poly(arylene ether)s that are more economical and convenient to prepare.

BRIEF SUMMARY

The above described and other drawbacks are alleviated by a functionalized poly(arylene ether) having the formula $$Q(J-K)_y$$

wherein Q is the residuum of a monohydric, dihydric, or polyhydric phenol; y is 1 to about 100; J comprises repeating structural units and has the formula

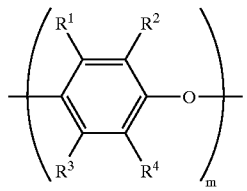

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; each occurrence of m is independently 1 to about 200; and K is a capping group having the formula

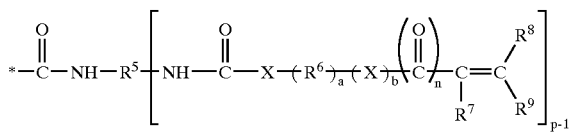

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue.

Other embodiments, including a method of preparing the functionalized poly(arylene ether) and a curable composition comprising the functionalized poly(arylene ether) are described below.

DETAILED DESCRIPTION OF THE PREFERRED EMBODIMENTS

One embodiment is a functionalized poly(arylene ether) having the formula $$Q(J-K)_y$$

wherein Q is the residuum of a monohydric, dihydric, or polyhydric phenol; y is 1 to 100; J comprises repeating structural units and has the formula

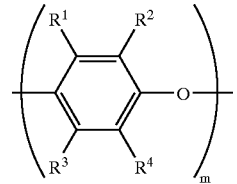

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; each occurrence of m is independently 1 to about 200; and K is a capping group having the formula

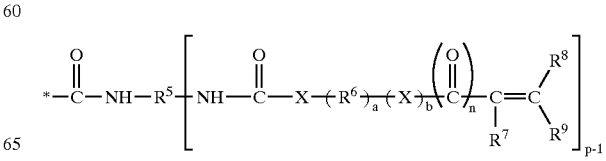

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10.

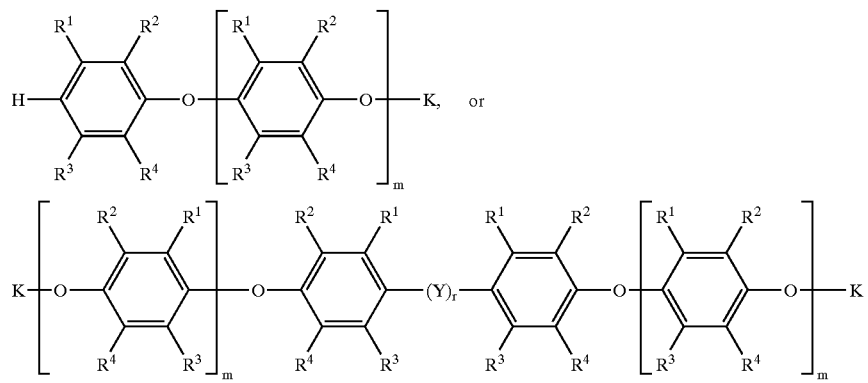

In one embodiment, Q is the residuum of a monohydric phenol and y is 1 (i.e., the functionalized poly(arylene ether) is a mono-capped poly(arylene ether)). In another embodiment, Q is the residuum of a dihydric phenol and y is 2 (i.e., the functionalized poly(arylene ether) is a di-capped poly(arylene ether)). In one embodiment, each occurrence of $R^1$ and $R^3$ is independently hydrogen or $C_1$–$C_{12}$ alkyl, and each occurrence of $R^2$ and $R^4$ is independently $C_1$–$C_{12}$ alkyl. In another embodiment, each occurrence of $R^1$ and $R^3$ is independently hydrogen or methyl and each occurrence of $R^2$ and $R^4$ is methyl. In one embodiment, each occurrence of $R^5$ is $C_6$–$C_{18}$ arylene. Specific examples of suitable $R^5$ groups include, for example, 1,2-phenylene, 1,3-phenylene, 1,4-phenylene, 1,2-naphthalenediyl, 1,3-naphthalenediyl, 1,4-naphthalenediyl, 1,5-naphthalenediyl, 1,6-naphthalenediyl, 1,7-naphthalenediyl, 1,8-naphthalenediyl, 2,3-naphthalenediyl, 2,6-naphthalenediyl, 2,7-naphthalenediyl, or the like, all of which can be unsubstituted or substituted. Preferred $R^5$ groups include 1,4-phenylene and 1,3-phenylene. In a preferred embodiment, each occurrence of X is —O—. In one embodiment, each occurrence of $R^6$ is independently $C_1$–$C_{12}$ alkylene or $C_6$–$C_{18}$ arylene. In a preferred embodiment, each occurrence of $R^6$ is dimethylene (—$CH_2CH_2$—). In one embodiment, each occurrence of n is 0 (e.g., the functionalized poly(arylene ether) may have a pendant allyl group or a pendant alkenyl aromatic group). In another embodiment, each occurrence is n is 1 (e.g., the functionalized poly(arylene ether) may have a pendant acrylate or methacrylate group). The prefix "(meth)acryl-" as used herein means "acryl-" or "methacryl-". In a preferred embodiment, each occurrence of $R^7$ is independently hydrogen or methyl, and each occurrence of $R^8$ and $R^9$ is hydrogen.

The number of repeating units in each poly(arylene ether) chain, m, determine the molecular weight and intrinsic viscosity of the functionalized poly(arylene ether). Each occurrence of m is preferably at least about 5, more preferably at least about 10. The desired intrinsic viscosity will depend on the intended use, but it is generally about 0.05 to about 1 deciliter per gram (dL/g), as measured at 25° C. in chloroform. Within this range, the intrinsic viscosity is preferably at least about 0.1 dL/g, more preferably at least about 0.2 dL/g, even more preferably at least about 0.3 dL/g. Also within this range, the intrinsic viscosity is preferably up to about 0.8 dL/g, more preferably up to about 0.6 dL/g, even more preferably up to about 0.5 dL/g.

In one embodiment, the functionalized poly(arylene ether) has the formula wherein each occurrence of $R^1$ and $R^3$ is independently hydrogen or methyl; each occurrence of $R^2$ and $R^4$ is methyl; each occurrence of m is independently 1 to about 200; r is 0 or 1; Y is a divalent group selected from

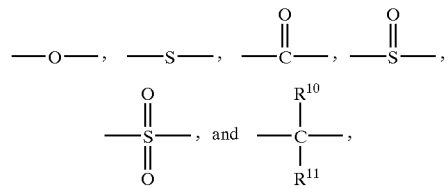

wherein each occurrence of $R^{10}$ and $R^{11}$ is independently hydrogen or $C_1$–$C_{12}$ hydrocarbyl; and K is a capping group having the formula

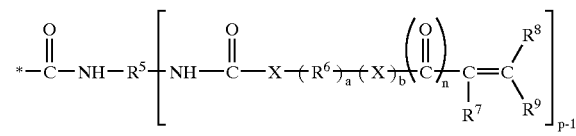

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10.

In another embodiment, the functionalized poly(arylene ether) has the formula

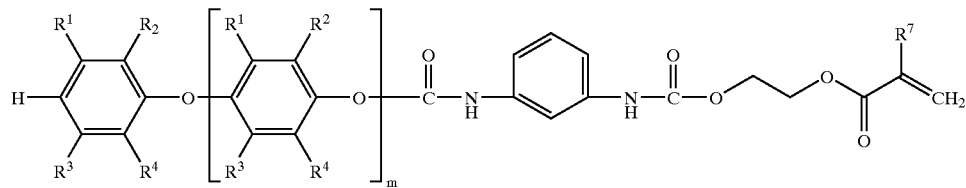

wherein each occurrence of $R^1$ and $R^3$ is independently hydrogen or methyl, each occurrence of $R^2$ and $R^4$ is methyl; $R^7$ is hydrogen or methyl; and m is 1 to about 200.

The functionalized poly(arylene ether) may be prepared by a process comprising: reacting a poly(arylene ether) with a polyisocyanate compound to form a urethane-capped poly(arylene ether) having pendant isocyanate functionality; and reacting the urethane-capped poly(arylene ether) having pendant isocyanate functionality with a polyfunctional compound comprising (a) a carbon—carbon double bond, and (b) a hydroxy (—OH), thiol (—SH), or amino (—NH₂) group to form the capped poly(arylene ether) having a pendant carbon—carbon double bond. In this process, the poly(arylene ether) has the structure $$Q(J-H)_y$$

wherein Q is the residuum of a monohydric, dihydric, or polyhydric phenol; H is a hydrogen atom; y is 1 to about 100; J comprises repeating structural units having the formula

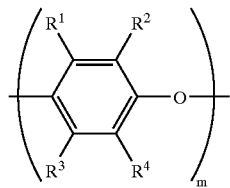

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; and m is 1 to about 200. In one embodiment, y is 1 or 2, wherein $R^1$ and $R^3$ are each independently hydrogen or methyl, and wherein $R^2$ and $R^4$ are each methyl. In another embodiment, y is 1, wherein $R^1$ and $R^3$ are each hydrogen, and wherein $R^2$ and $R^4$ are each methyl.

The polyfunctional compound may have the structure $$R^5(NCO)_p$$

wherein p is 2 to about 10, preferably 2 or 3 or 4, more preferably 2 or 3, still more preferably 2; and $R^5$ is a polyvalent hydrocarbon radical, optionally substituted with heteroatoms, having a valence equal to p. When p is greater than 2, the functionalized poly(arylene ether) ultimately formed has more than one polymerizable group per hydroxyl endgroup on the poly(arylene ether) starting material. In a preferred embodiment, the polyfunctional compound has the structure $$O{=}C{=}N-R^{12}-N{=}C{=}O$$

wherein $R^{12}$ is $C_1$–$C_{18}$ hydrocarbylene, optionally substituted with heteroatoms. Preferably, $R^{12}$ is $C_6$–$C_{18}$ arylene. Suitable polyisocyanate compounds include, for example, isophorone diisocyanate (IPDI), tetramethylxylene diisocyanate (TMXDI), toluene diisocyanate (TDI), diphenylmethylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, polyalkyleneoxide diisocyanates (such as polytetramethylene ether glycol terminated with TDI), polyester glycol diisocyanates (such as polyethylene adipate terminated with TDI), 2,4,6-toluene triisocyanate, triphenyldimethylene triisocyanate, 4,4',4"-triphenylmethylene triisocyanate, 4,4'-dimethyl-diphenylmethane-2,2',5,5'-tetraisocyanate, tetraphenyltrimethylene tetraisocyanate, pentaphenyltetramethylene pentaisocyanate, and the like, and mixtures thereof.

The reaction of the poly(arylene ether) with the polyisocyanate compound generates a functionalized poly(arylene ether) intermediate having the structure $$Q(J-L)_y$$

wherein Q is the residuum of a monohydric, dihydric, or polyhydric phenol; y is 1 to about 100; J comprises repeating structural units having the formula

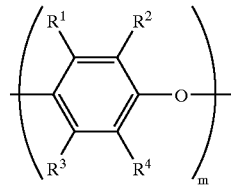

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; each occurrence of m is independently 1 to about 200; and L is a capping group having the formula

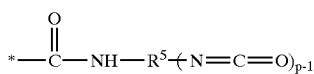

wherein each occurrence of $R^5$ is independently $C_1$–$C_{18}$ hydrocarbylene, optionally substituted with heteroatoms; and p is 2 to about 10. In addition to being useful in the reaction with the polyfunctional compound, this functionalized poly(arylene ether) intermediate may be used to form a variety of other poly(arylene ether) derivatives. In one embodiment, reaction with a diamino compound $R^{18}(NH_2)_2$ generates an amino-functionalized poly(arylene ether) having the structure $Q(J-A)_y$ wherein Q, J, and y are as defined above, and A is a capping group having the formula

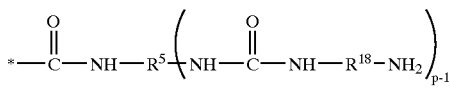

wherein each occurrence of $R^5$ and $R^{18}$ is independently $C_1$–$C_{18}$ hydrocarbylene, optionally substituted with heteroatoms; and p is 2 to about 10. This amino-functionalized poly(arylene ether) is useful as a starting material for the formation of poly(arylene ether)-polysiloxane block copolymers, poly(arylene ether)-polyimide block copolymers, poly(arylene ether)-polyamide block copolymers, poly(arylene ether)-polyether block copolymers, and the like. In another embodiment, reaction with a dihydroxy compound $R_{19}(OH)_2$ generates a hydroxy-functionalized poly(arylene ether) having the structure $Q(J-B)_y$ wherein Q, J, and y are as defined above, and B is a capping group having the formula

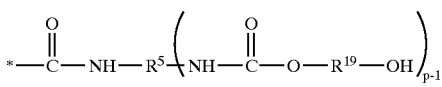

wherein each occurrence of $R^5$ and $R^{19}$ is independently $C_1$–$C_{18}$ hydrocarbylene, optionally substituted with heteroatoms; and p is 2 to about 10. This hydroxy-functionalized poly(arylene ether) is useful as a starting material for the formation of poly(arylene ether)-polyester block copolymers, poly(arylene ether)-polysiloxane block copolymers, poly(arylene ether)-polyurethane block copolymers, poly(arylene ether)-polyether block copolymers, and the like. In another embodiment, reaction with a diacid compound $R_{20}(CO_2H)_2$ generates, after decarboxylation, an acid-functionalized poly(arylene ether) having the structure $Q(J-D)_y$ wherein Q, J, and y are as defined above, and D is a capping group having the formula

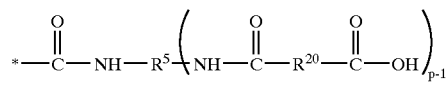

wherein each occurrence of $R^5$ and $R^{20}$ is independently $C_1$–$C_{18}$ hydrocarbylene, optionally substituted with heteroatoms; and p is 2 to about 10. This acid-functionalized poly(arylene ether) is useful as a starting material for the formation of poly(arylene ether)-polyester block copolymers, poly(arylene ether)-polyurethane block copolymers, poly(arylene ether)-polyether block copolymers, and the like. In another embodiment, polymerization of a monomer containing a carbon—carbon-double bond in the presence of the functionalized poly(arylene ether) having pendant isocyanate functionality generates a polymer-functionalized poly(arylene ether) having the formula $Q(J-E)_y$ wherein Q, J, and y are as defined above, and E is a capping group having the formula

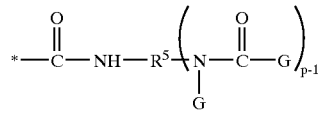

wherein G is a radical formed from polymerization of the monomer containing a carbon—carbon-double bond. For example, when the monomer containing a carbon—carbon-double bond is styrene, G would represent a polystyryl radical. The functionalized poly(arylene ether) intermediate with pendant isocyanate functionality is also useful for copolymerization with low molecular weight reactive compounds such as, for example, epoxy compounds, isocyanate compounds, and cyanate esters.

The polyfunctional compound may have the structure

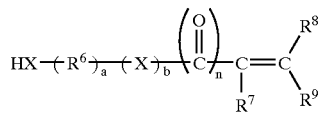

wherein each occurrence of X is —NH—, —O—, or —S—; $R^6$ is $C_1$–$C_{18}$ hydrocarbylene, optionally substituted with heteroatoms; $R^7$, $R^8$, and $R^9$ are independently hydrogen or $C_1$–$C_{18}$ hydrocarbyl; a is 0 or 1; b is 0 or 1; and n is 0 or 1. Suitable polyfunctional compounds include, for example, vinyl alcohol, 2-hydroxyethyl (meth)acrylate, 2-hydroxypropyl (meth)acrylate, hydroxymethyl (meth)acrylate, N-hydroxymethyl (meth)acrylamide, polyethylene glycol (meth)acrylate, polypropylene glycol (meth)acrylate, hydroxystyrenes (such as 4-hydroxystyrene), hydroxymethylstyrenes (such as 3-hydroxymethylstyrene and 4-hydroxymethylstyrene), carboxystyrenes (such as 4-carboxystyrene), hydroxyethyl vinyl ether, (meth)acrylic acid, and the like, and mixtures thereof.

The reactions of the poly(arylene ether) with the polyisocyanate compound and the urethane-capped poly(arylene ether) with the polyfunctional compound may be conducted in the presence of a catalyst. Suitable commercially available catalysts include tertiary amine activators (which accelerate the heat activation of the reaction) such as, for example, triethylamine, tributylamine, N-methylmorpholine, N-ethylmorpholine, N,N,N',N'-tetramethylenediamine, 1,4-diazabicyclo[2,2,2]octane, N-methyl-N'-dimethylaminoethylpiperazine, N,N-diethylbenzylamine, N,N-diethylbenzylamine, 2-methylimidazole, and the like, and mixtures thereof. Other suitable catalysts are metal catalysts such as, for example, stannous chloride, stannous octoate, di-n-butyltindilaurate, stannous oxide, stannous oxalate, butyltin-tris(2-ethylhexoate), dibutyltin oxide, and the like, and mixtures thereof. Mixtures of the tertiary amines and metal catalysts can be used in a synergistic manner. The catalyst used in the first step is often ideally used in the second step. The reactions may also be catalyzed by amine functionality bound to the polyphenylene ether.

The steps of reacting the poly(arylene ether) with the polyisocyanate compound and reacting the urethane-capped poly(arylene ether) with the polyfunctional compound may be conducted at a temperature of about 25° C. to about 150° C. Within this range, the reaction temperature is preferably at least 40° C., more preferably at least 60° C., even more preferably at least 70° C. Also within this range, the reaction temperature is preferably up to about 120° C., more preferably up to about 100° C. The reactions may be carried out in the absence of solvent (for example, reactions may be conducted without solvent in an extruder). Alternatively, the reactions may be performed in a reactive or unreactive solvent. Suitable unreactive solvents include, for example, aromatic hydrocarbons, such as benzene, toluene, and xylenes; tetrahydrofuran; chlorinated hydrocarbons such as chloroform and o-dichlorobenzene; and the like; and mixtures thereof. Suitable reactive solvents include, for example, olefinically unsaturated monomers such as styrene, 2- or 3- or 4-methylstyrene, mono- or di- or tri-bromostyrenes, ethylstyrenes, t-butylstyrenes, diallyl phthalate, triallyl cyanurate, triallyl isocyanurate, bisphenol-A diethoxylate di(meth)acrylate, and the like, and mixtures thereof. For reacting the poly(arylene ether) with the polyisocyanate compound the poly(arylene ether) is preferably present at a concentration of between about 1 to about 80 weight percent, based on the total weight of the reaction mixture. Within this range, the poly(arylene ether) concentration is preferably at least about 10 weight percent, more preferably at least about 15 weight percent. Also within this range, the poly(arylene ether) concentration is preferably up to about 60 weight percent, more preferably up to about 40 weight percent. A wide range of molar ratios of polyisocyanate to poly(arylene ether) may be used. For example, the molar ratio of polyisocyanate to poly(arylene ether) may be about 0.1 to about 10,000. If the ratio is less than one, the product may comprise a mixture of unreacted poly(arylene ether) and isocyanate-functionalized poly(arylene ether). If the ratio is greater than one (in particular, if the ratio of polyisocyanate to poly(arylene ether) hydroxyl groups is greater than one), the product may comprise isocyanate-functionalized poly(arylene ether) and excess polyisocyanate. The polyisocyanate may be used as a copolymerizable monomer. Alternatively, if the isocyanate-functionalized poly(arylene ether) is further reacted with a polyfunctional compound, excess polyfunctional compound may be added to react with the excess polyisocyanate to form another copolymerizable monomer. Preferably, the molar ratio of polyisocyanate to poly(arylene ether) may be about 1 to about 100, more preferably about 1 to about 50. The step of reacting the urethane-capped poly(arylene ether) having pendant isocyanate functionality with a polyfunctional compound may be carried out at similar temperatures to the first step and in the same solvent. However, additional solvents or catalysts may be added to improve fluidity or reactivity. Further addition of a second solvent to the mixture from the first step, followed by removal of the first solvent or second solvent or both by distillation is contemplated. The time required for each step is dependent upon temperature and concentration of poly(arylene ether) endgroups and reagents. Reaction times for the first and second steps are independently about 0.05 to about 200 hours, preferably about 1 to about 5 hours. The urethane-capped poly(arylene ether) from the first step may, optionally, be isolated prior to reaction with the polyfunctional compound. Isolation may be by precipitation with a solvent that is unreactive toward the pendant isocyanate functionality, or by devolatilization of the solvent. The isolated urethane-capped poly(arylene ether) could then be used in further reactions as described herein.

One embodiment is a curable composition, comprising: an olefinically unsaturated monomer; and a functionalized poly(arylene ether) of the formula $Q(J-K)_y$ wherein Q is the residuum of a monohydric, dihydric, or polyhydric phenol; y is 1 to about 100; J comprises repeating structural units having the formula

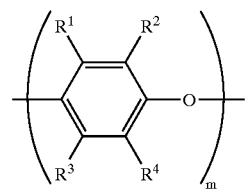

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; each occurrence of m is independently 1 to about 200; and K is a capping group having the formula

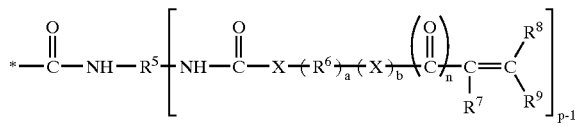

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10.

The curable composition may comprise about 5 to about 90 parts by weight of the capped poly(arylene ether) per 100 parts by weight total of the capped poly(arylene ether) and the olefinically unsaturated monomer. Within this range, the amount of the capped poly(arylene ether) resin may preferably be at least about 10 parts by weight, more preferably at least about 15 parts by weight. Also within this range, the amount of the capped poly(arylene ether) resin may preferably be up to about 80 parts by weight, more preferably up to about 60 parts by weight, still more preferably up to about 50 parts by weight.

In addition to the functionalized poly(arylene ether), the curable composition comprises an olefinically unsaturated monomer. The olefinically unsaturated monomer is herein defined as a polymerizable monomer comprising a carbon—carbon double bound. Suitable olefinically unsaturated monomers include, for example, alkenyl aromatic monomers, allylic monomers, acryloyl monomers, vinyl ethers, maleimides, and the like, and mixtures thereof.

The alkenyl aromatic monomer may have the formula

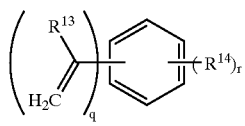

wherein each occurrence of $R^{13}$ is independently hydrogen or $C_1$–$C_{18}$ hydrocarbyl; each occurrence of $R^{14}$ is independently halogen, $C_1$–$C_{12}$ alkyl, $C_1$–$C_{12}$ alkoxyl, or $C_6$–$C_{18}$ aryl; q is 1 to 4; and r is 0 to 5. Unspecified positions on the aromatic ring are substituted with hydrogen atoms. Suitable alkenyl aromatic monomers include, for example, styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. Styrene is a particularly preferred alkenyl aromatic monomer.

The olefinically unsaturated monomer may be an allylic monomer. An allylic monomer is an organic compound comprising at least one, preferably at least two, more preferably at least three allyl (—CH₂—CH=CH₂) groups. Suitable allylic monomers include, for example, diallyl phthalate, diallyl isophthalate, triallyl mellitate, triallyl mesate, triallyl benzenes, triallyl cyanurate, triallyl isocyanurate, mixtures thereof, partial polymerization products prepared therefrom, and the like.

The olefinically unsaturated monomer may be an acryloyl monomer. An acryloyl monomer is a compound comprising at least one acryloyl moiety having the structure

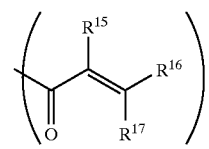

wherein $R^{15}$–$R^{17}$ are each independently hydrogen, $C_1$–$C_{12}$ hydrocarbyl, $C_2$–$C_{18}$ hydrocarbyloxycarbonyl, nitrile, formyl, carboxylic acid, imidate, thiocarboxylic acid, or the like. In one embodiment, the acryloyl monomer comprises at least two acryloyl moieties. In another embodiment, the acryloyl monomer comprises at least three acryloyl moieties. Suitable acryloyl monomers include, for example, trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, methacryloxypropyl trimethoxysilane (also known as 3-(trimethoxysilyl)propyl methacrylate), ethoxylated (2) bisphenol A di(meth)acrylate (it will be understood that the number following the ethoxylated term refers to the average number of ethoxy groups in the ethoxylate chain attached to each oxygen of bisphenol A), and the like, and mixtures comprising at least one of the foregoing acryloyl monomers.

In one embodiment, the olefinically unsaturated monomer comprises an acryloyl monomer formed by reaction of polyisocyanate with polyfunctional compound. For example, if the poly(arylene ether) is reacted with excess 1,3-phenyldiisocyanate, and the resulting mixture is subsequently reacted with 2-hydroxyethyl (meth)acrylate, the curable composition will comprise an acryloyl monomer having the structure

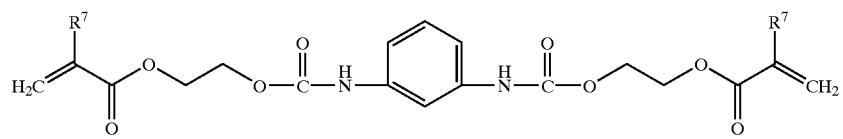

wherein $R^7$ is hydrogen (for acrylate) or methyl (for methacrylate).

In another embodiment, the olefinically unsaturated monomer comprises styrene and trimethylolpropane trimethacrylate.

The olefinically unsaturated monomer may be a vinyl ether. Vinyl ethers are compounds comprising at least one moiety having the structure

Suitable vinyl ethers include, for example, 1,2-ethylene glycol divinyl ether, 1,3-propanediol divinyl ether, 1,4-butanediol divinyl ether, triethyleneglycol divinyl ether, 1,4-cyclohexanedimethanol divinyl ether, ethyl vinyl ether, n-butyl vinyl ether, lauryl vinyl ether, 2-chloroethyl vinyl ether, and the like, and mixtures thereof.

The olefinically unsaturated monomer may be a maleimide. A maleimide is a compound comprising at least one moiety having the structure

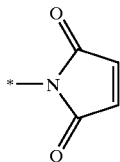

Suitable maleimides include, for example, N-phenylmaleimide, 1,4-phenylene-bis-methylene-α,α'-bismaleimide, 2,2-bis(4-phenoxyphenyl)-N,N'-bismaleimide, N,N'-phenylene bismaleimide, N,N'-hexamethylene bismaleimide, N—N'-diphenyl methane bismaleimide, N,N'-oxy-di-p-phenylene bismaleimide, N,N'-4,4'-benzophenone bismaleimide, N,N'-p-diphenylsulfone bismaleimide, N,N'-(3,3'-dimethyl)methylene-di-p-phenylene bismaleimide, poly(phenylmethylene) polymaleimide, bis(4-phenoxyphenyl)sulfone-N,N'-bismaleimide, 1,4-bis(4-phenoxy)benzene-N,N'-bismaleimide, 1,3-bis(4-phenoxy)benzene-N,N'-bismaleimide, 1,3-bis(3-phenoxy)benzene-N,N'-bismaleimide, and the like, and mixtures thereof.

The composition may generally comprise about 10 to about 95 parts by weight of the olefinically unsaturated monomer per 100 parts by weight total of the capped poly(arylene ether) and the olefinically unsaturated monomer. Within this range, it may be preferable to use an olefinically unsaturated monomer amount of at least about 20 parts by weight, more preferably at least about 30 parts by weight. Also within this range, it may be preferable to use an olefinically unsaturated monomer amount of up to about 80 parts per weight, more preferably up to about 60 parts by weight.

As the curable composition is defined as comprising multiple components, it will be understood that each component is chemically distinct, particularly in the instance that a single chemical compound may satisfy the definition of more than one component.

The curable composition may, optionally, further comprise a curing initiator. Curing initiators, also referred to as curing catalysts, are well known in the art and may be used to initiate the polymerization, curing, or crosslinking of numerous thermoplastics and thermosets including unsaturated polyester, vinyl ester and allylic thermosets. Non-limiting examples of curing initiators include those described in U.S. Pat. No. 5,407,972 to Smith et al., and U.S. Pat. No. 5,218,030 to Katayose et al. The curing initiator may include any compound capable of producing free radicals at elevated temperatures. Such curing initiators may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, trimethylsilylphenyltriphenylsilyl peroxide, and the like, and mixtures thereof. Suitable non-peroxy initiators include, for example, 2,3-dimethyl-2,3-diphenylbutane, 2,3-trimethylsilyloxy-2,3-diphenylbutane, and the like, and mixtures thereof. The curing initiator for the unsaturated portion of the thermoset may further include any compound capable of initiating anionic polymerization of the unsaturated components. Such anionic polymerization initiators include, for example, alkali metal amides, such as sodium amide ($NaNH_2$) and lithium diethyl amide ($LiN(C_2H_5)_2$); alkali metal and ammonium salts of $C_1$–$C_{10}$ alkoxides; alkali metal and ammonium hydroxides; alkali metal cyanides; organometallic compounds such as the alkyl lithium compound n-butyl lithium; Grignard reagents such as phenyl magnesium bromide; and the like; and combinations thereof. In a preferred embodiment, the curing initiator may comprise t-butylperoxy benzoate or dicumyl peroxide. The curing initiator may promote curing at a temperature in a range of about 0° C. to about 200° C.

When present, the curing initiator may be used at about 0.1 to about 5 parts by weight per 100 parts by weight total of the functionalized poly(arylene ether) and the olefinically unsaturated monomer. Within this range, the curing initiator amount is preferably at least about 0.5 part by weight, more preferably at least about 1 part by weight. Also within this range, the curing initiator amount is preferably up to about 4 parts by weight, more preferably up to about 3 parts by weight. Alternatively, the curing initiator amount may be expressed in units of micromoles per gram of resin, where "resin" consists of the functionalized poly(arylene ether) and the olefinically unsaturated monomer. In this embodiment, the curing initiator amount is preferably at least about 100 micromoles per gram of resin.

The curable composition may, optionally, further comprise a curing inhibitor. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$–$C_6$-alkyl-substituted catechols, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations thereof. Suitable curing inhibitors further include uncapped poly(arylene ether)s (i.e., poly(arylene ether)s having free hydroxyl groups). With reference to the capped poly(arylene ether)

structure $Q(J—K)_y$, above, the uncapped poly(arylene ether) may have the structure $Q(J—H)_y$, wherein each capping group K is replaced by a hydrogen atom, H. Preferred curing inhibitors include benzoquinone, hydroquinone, and 4-t-butylcatechol.

When the curing inhibitor is present, it may be used at about 0.005 to about 1 part by weight per 100 parts by weight total of the functionalized poly(arylene ether) and the olefinically unsaturated monomer. Within this range, the curing inhibitor amount may preferably be at least about 0.05 part by weight, more preferably at least about 0.1 part by weight. Also within this range, the curing inhibitor amount may preferably be up to about 0.5 part by weight, more preferably up to about 0.3 part by weight. In one embodiment, the curing inhibitor amount may be expressed in units of micromoles per gram of resin, where "resin" consists of the functionalized poly(arylene ether) and the olefinically unsaturated monomer. In this embodiment, the curing inhibitor amount is preferably at least about 50 micromoles per gram of resin.

The curable composition may, optionally, further comprise one or more fillers, including particulate fillers and fibrous fillers. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having high thermal conductivity, low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (in its anhydrous, hemihydrated, dihydrated, or trihydrated forms), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, nodular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilane or acryloyl-silane coatings to impart good physical properties to compounded blends; feldspar and nepheline syenite; silicate spheres; flue dust; cenospheres; fillite; aluminosilicate (armospheres), including silanized and metallized aluminosilicate; natural silica sand; quartz; quartzite; perlite; Tripoli; diatomaceous earth; synthetic silica, including those with various silane coatings; and the like.

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Preferred fibrous fillers include glass fibers having a diameter in a range of about 5 to about 25 micrometers and a length before compounding in a range of about 0.5 to about 4 centimeters. Many other suitable fillers are described in U.S. Pat. No. 6,352,782 B2 to Yeager et al.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1–3, R is an alkyl or aryl group and Y is a reactive functional group which can enable formation of a bond with a polymer molecule. Particularly useful examples of coupling agents are those having the structure $(RO)_3SiY$. Typical examples include vinyl triethoxysilane, vinyl tris(2-methoxy)silane, phenyl trimethoxysilane, γ-methacryloxypropyltrimethoxy silane, γ-aminopropyltriethoxysilane, γ-glycidoxypropyltrimethoxysilane, γ-mercaptopropyltrimethoxysilane, and the like. Silanes further include molecules lacking a reactive functional group, such as, for example, trimethoxyphenylsilane. The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

When present, the particulate filler may be used in an amount of about 5 to about 95 weight percent, based on the total weight of the composition. Within this range, it may be preferable to use a particulate filler amount of at least about 20 weight percent, more preferably at least about 40 weight percent, even more preferably at least about 75 weight percent. Also within this range, it may be preferable to use a particulate filler amount of up to about 93 weight percent, more preferably up to about 91 weight percent.

When present, the fibrous filler may be used in an amount of about 2 to about 80 weight percent, based on the total weight of the composition. Within this range, it may be preferred to use a fibrous filler amount of at least about 5 weight percent, more preferably at least about 10 weight percent, yet more preferably at least about 15 weight percent. Also within this range, it may be preferred to use a fibrous filler amount of up to about 60 weight percent, more preferably up to about 40 weight percent, still more preferably up to about 30 weight percent.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, antioxidants, heat stabilizers, light stabilizers, plasticizers, lubricants, flow modifiers, drip retardants, antiblocking agents, antistatic agents, flow-promoting agents, processing aids, substrate adhesion agents, mold release agents, toughening agents, low-profile additives, stress-relief additives, flame retardants, and the like, and combinations thereof. Those skilled in the art may select suitable additives and determine suitable amounts without undue experimentation.

There is no particular limitation on the method by which the curable composition is prepared. The composition may be prepared by forming an intimate blend comprising the functionalized poly(arylene ether) and the olefinically unsaturated monomer the acryloyl monomer. When the composition comprises an alkenyl aromatic monomer and a capped poly(arylene ether), the composition may be prepared directly from an unfunctionalized poly(arylene ether) by dissolving the uncapped poly(arylene ether) in a portion of the alkenyl aromatic monomer, adding a capping agent to form the capped poly(arylene ether) in the presence of the alkenyl aromatic monomer, and adding the acryloyl monomer, the metallophosphorus flame retardant, and any other components to form the thermoset composition.

There is no particular limitation on the method by which the composition may be cured. The composition may, for example, be cured thermally or by using irradiation techniques, including radio frequency heating, UV irradiation and electron beam irradiation. For example, the composition may be cured by initiating chain-reaction curing with 10 seconds of radio frequency heating. When heat curing is used, the temperature selected may be in a range of about 80° to about 300° C. The heating period may be in a range of about 5 seconds to about 24 hours. Curing may be staged to produce a partially cured and often tack-free resin, which then is fully cured by heating for longer periods or at higher temperatures.

One embodiment is a cured composition obtained by curing any of the above-described curable compositions. It will be understood that the term "curing" includes partially curing and fully curing. Because the components of the curable composition may react with each other during curing, the cured compositions may be described as comprising the reaction products of the curable composition components. Another embodiment is an article comprising any of the cured compositions.

Molding compositions and laminate compositions are only a few of the many potential applications possible for the composition. Potential applications for the use of the composition include those known to the art for thermoplastics and thermosetting resins, particularly those having properties such as high glass transition temperature, toughness, excellent dielectric properties, and good flow properties.

The invention is further illustrated by the following non-limiting examples.

PREPARATIVE EXAMPLE 1

Poly(2,6-dimethyl-1,4-phenylene ether) (680 grams; intrinsic viscosity 0.25 deciliters per gram measured in chloroform at 25° C.; 136.22 µmol/g OH; 0.0927 moles OH) was dissolved in styrene monomer (1500 grams) by heating to 70° C. After dissolution was complete, 4,4'-methylenebis(phenylisocyanate) (23.20 grams; 0.0927 moles; 0.1854 moles NCO) and N,N-dimethylaminopyridine (1.22 grams; 0.01 moles) were added. Heating was continued for 2 hours, after which 2-hydroxyethylmethacrylate (12.05 grams; 0.0927 moles) was added and the solution was stirred for an addition 2 hours. The resulting solution was cooled to 50° C. and tert-butylhydroquinone (5.58 grams) was added as an inhibitor. The resulting solution was then cooled to room temperature and is hereinafter referred to as Preparative Example 1.

COMPARATIVE PREPARATIVE EXAMPLE 1

A solution of methacrylate-capped polyphenylene ether (intrinsic viscosity 0.25 dl/g measured in chloroform at 25° C.; 136.22 µmol/g OH) was prepared in styrene according to the procedure of U.S. Pat. No. 6,627,704 B2 to Yeager et al., Preparative Example 5. The resulting solution is hereinafter referred to as Comparative Preparative Example 1.

EXAMPLE 1, COMPARATIVE EXAMPLE 1

Bulk molding compounds were prepared using Preparative Example 1 and Preparative Comparative Example 1. Compositions are detailed in Table 2, where amounts are expressed in parts by weight. First, the poly(arylene ether)-containing solutions, as prepared above, were heated until fluid. Additional styrene, trimethylolpropane trimethacrylate, polyisobutylvinyl ether, and polybutadiene-graft-maleic anhydride were added and the solution stirred until homogeneous. Then calcium carbonate was added in portions and the solution was vigorously stirred. Magnesium oxide and t-butylperoxybenzoate were added. This resulting paste was poured into a high shear mixer where 20% by weight of glass fiber (Owens Corning 101C) was added. The solution was stirred until the fiber had been well impregnated with the paste. The resulting material was transferred and bundled into 650-gram portions with a MYLAR® release film. The bulk molding compounds were allowed to age for 1 day. The compounds were compression molded for 3 minutes at 150° C. into 12"×12"×⅛" plaques for further testing. Shrinkage was determined by comparing a dimension of a molded part with the corresponding dimension of the mold, both at 25° C. A positive shrinkage value indicates that the molded part was smaller than the mold. This comparison was performed at room temperature about 24 hours after the samples were molded. Glass transition temperature ($T_g$) values, expressed in ° C., and coefficients of thermal expansion (CTE), expressed in parts per million (ppm), were measured according ASTM D6341. Flexural strength and flexural modulus, both expressed in pounds per square inch (psi), were measured according to ASTM D790. The results of the testing are shown in Table 1. The results show that the molding composition containing the inventive functionalized poly(arylene ether) exhibited reduced shrinkage compared to the comparative example with a simple methacrylate-capped poly(arylene ether).

TABLE 1

|  | Ex. 1 | C. Ex. 1 |
| --- | --- | --- |
| Solution from Preparative Ex. 1 | 30 |  |
| Solution from Comparative Preparative Ex. 1 |  | 30 |
| Trimethylolpropane trimethacrylate | 43.75 | 43.75 |
| Additional Styrene | 47.25 | 47.25 |
| Poly(isobutyl vinyl ether) | 30 | 30 |
| Polybutadiene-graft-maleic anhydride | 5 | 5 |
| t-Butylperoxybenzoate | 2 | 2 |
| Zinc stearate | 5 | 5 |
| Magnesium oxide | 1 | 1 |
| Properties |  |  |
| Shrinkage (%) | 0.040 | 0.051 |
| CTE below $T_g$ (ppm) | 55 | 46 |
| CTE above $T_g$ (ppm) | 134 | 92 |
| $T_g$ (° C.) | 109 | 129 |
| Flexural strength (psi) | 12,800 | 12,600 |
| Flexural modulus (psi) | 1,000,000 | 995,000 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A functionalized poly(arylene ether) having the formula $$Q(J-K)_y$$

wherein Q is the residuum of a monohydric, dihydric, or polyhydric phenol; y is 1 to about 100; J comprises repeating structural units having the formula

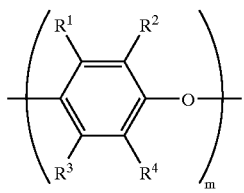

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; each occurrence of m is independently 1 to about 200; and K is a capping group having the formula

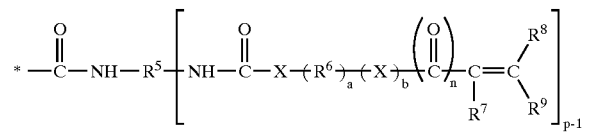

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10.

2. The functionalized poly(arylene ether) of claim 1, wherein Q is the residuum of a monohydric phenol and y is 1.

3. The functionalized poly(arylene ether) of claim 1, wherein Q is the residuum of a dihydric phenol and y is 2.

4. The functionalized poly(arylene ether) of claim 1, wherein each occurrence of $R^1$ and $R^3$ is independently hydrogen or $C_1$–$C_{12}$ alkyl and each occurrence of $R^2$ and $R^4$ is independently $C_1$–$C_{12}$ alkyl.

5. The functionalized poly(arylene ether) of claim 1, wherein each occurrence of $R^1$ and $R^3$ is independently hydrogen or methyl and each occurrence of $R^2$ and $R^4$ is methyl.

6. The functionalized poly(arylene ether) of claim 1, wherein each occurrence of $R^5$ is $C_6$–$C_{18}$ arylene.

7. The functionalized poly(arylene ether) of claim 1, wherein each occurrence of $R^5$ is independently 1,4-phenylene or 1,3-phenylene.

8. The functionalized poly(arylene ether) of claim 1, wherein each occurrence of X is oxygen.

9. The functionalized poly(arylene ether) of claim 1, wherein each occurrence of $R^6$ is independently $C_1$–$C_{12}$ alkylene or $C_6$–$C_{18}$ arylene.

10. The functionalized poly(arylene ether) of claim 1, wherein each occurrence of $R^6$ is dimethylene or trimethylene.

11. The functionalized poly(arylene ether) of claim 1, wherein each occurrence of n is 0.

12. The functionalized poly(arylene ether) of claim 1, wherein each occurrence of n is 1, each occurrence of $R^7$ is independently hydrogen or methyl, and each occurrence of $R^8$ and $R^9$ is hydrogen.

13. The functionalized poly(arylene ether) of claim 1, having an intrinsic viscosity of about 0.05 to about 1 deciliter per gram measured at 25° C. in chloroform.

14. A functionalized poly(arylene ether) having the formula

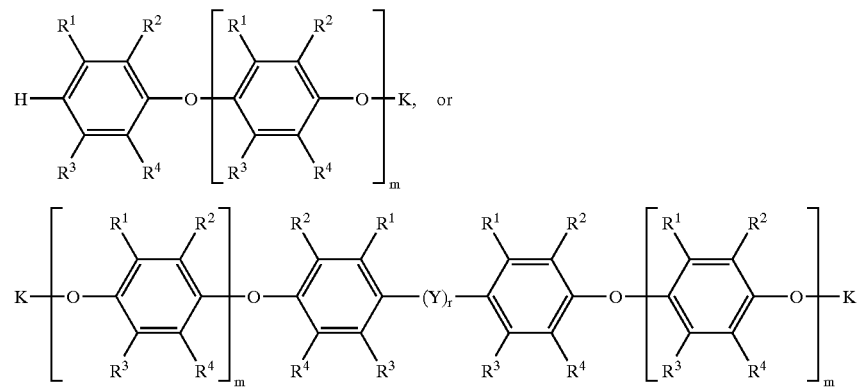

wherein each occurrence of $R^1$ and $R^3$ is independently hydrogen or methyl; each occurrence of $R^2$ and $R^4$ is methyl; each occurrence of m is independently 1 to about 200; r is 0 or 1; Y is a divalent group selected from

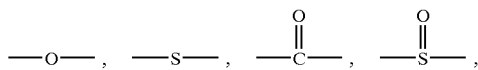

and

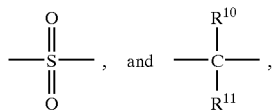

wherein each occurrence of $R^{10}$ and $R^{11}$ is independently hydrogen or $C_1$–$C_{12}$ hydrocarbyl; and K is a capping group having the formula

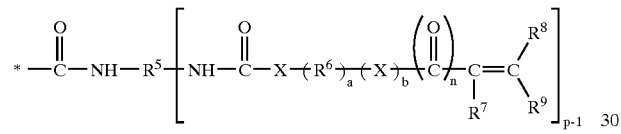

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10.

15. A functionalized poly(arylene ether) having the formula

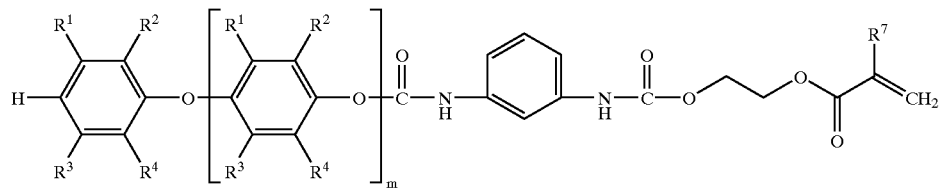

wherein each occurrence of $R^1$ and $R^3$ is independently hydrogen or methyl, each occurrence of $R^2$ and $R^4$ is methyl; $R^7$ is hydrogen or methyl; and m is 1 to about 200.

16. A functionalized poly(arylene ether) having the formula

Q(J—L)$_y$ wherein Q is the residuum of a monohydric, dihydric, or polyhydric phenol; y is 1 to about 100; J comprises repeating structural units having the formula

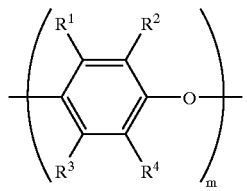

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; each occurrence of m is independently 1 to about 200; and L is a capping group having the formula

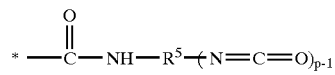

wherein each occurrence of $R^5$ is independently $C_1$–$C_{18}$ hydrocarbylene, optionally substituted with heteroatoms; and p is 2 to about 10.

17. A curable composition, comprising:
an olefinically unsaturated monomer; and
a functionalized poly(arylene ether) of the formula Q(J—K)$_y$ wherein Q is the residuum of a monohydric, dihydric, or polyhydric phenol; y is 1 to about 100; J comprises repeating structural units and has the formula

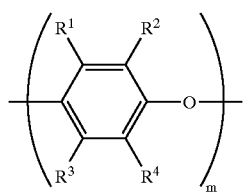

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; m is 1 to about 200; and K is a capping group having the formula

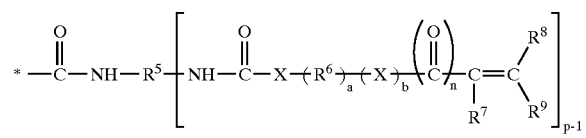

wherein each occurrence of $R^5$ and $R^6$ is independently $C_1$–$C_{18}$ hydrocarbylene, optionally substituted with heteroatoms; each occurrence of $R^7$–$R^9$ is independently hydrogen or $C_1$–$C_{18}$ hydrocarbyl; each occurrence of a is independently 0 or 1; each occurrence of b is independently 0 or 1; each occurrence of n is independently 0 or 1; each occurrence of X is independently —NH—, —O—, or —S—; and p is 2 to about 10.

18. The curable composition of claim 17, wherein the olefinically unsaturated monomer is selected from alkenyl aromatic monomers, allylic monomers, acryloyl monomers, vinyl ethers, maleimides, and mixtures thereof.

19. The curable composition of claim 17, further comprising a curing initiator.

20. The curable composition of claim 17, further comprising a curing inhibitor.

21. The curable composition of claim 17, further comprising a filler.

22. A cured composition, comprising the reaction products obtained by curing the curable composition of claim 17.

23. A process for preparing a functionalized poly(arylene ether) having a pendant carbon—carbon double bond, comprising:

reacting a poly(arylene ether) with a polyisocyanate compound to form a urethane-capped poly(arylene ether) having pendant isocyanate functionality; and reacting the urethane-capped poly(arylene ether) having pendant isocyanate functionality with a polyfunctional compound comprising (a) a carbon—carbon double bond, and (b) a hydroxy, thiol, or amino group to form the capped poly(arylene ether) having a pendant carbon—carbon double bond.

24. The method of claim 23, wherein the poly(arylene ether) has the structure

Q(J—H)$_y$ wherein Q is the residuum of a monohydric, dihydric, or polyhydric phenol; H is a hydrogen atom; y is 1 to about 100; J comprises repeating structural units and has the formula

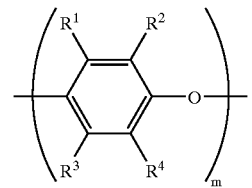

wherein $R^1$ and $R^3$ are each independently selected from hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; and each occurrence of m is independently 1 to about 200.

25. The method of claim 23, wherein y is 1 or 2, wherein $R^1$ and $R^3$ are each independently hydrogen or methyl, and wherein $R^2$ and $R^4$ are each methyl.

26. The method of claim 23, wherein y is 1, wherein $R^1$ and $R^3$ are each hydrogen, and wherein $R^2$ and $R^4$ are each methyl.

27. The method of claim 23, wherein the polyisocyanate compound has the structure $R^5(NCO)_p$ wherein p is 2 to about 10; and $R^5$ is a polyvalent hydrocarbon radical having a valence equal to p, optionally substituted with heteroatoms.

28. The method of claim 23, wherein the polyisocyanate compound comprises a diisocyanate, a triisocyanate, a tetraisocyanate, or a mixture thereof.

29. The method of claim 23, wherein the polyisocyanate compound is selected from isophorone diisocyanate, tetramethylxylene diisocyanate, toluene diisocyanate, diphenylmethylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, polyalkyleneoxide diisocyanates, polyester glycol diisocyanates, 2,4,6-toluene triisocyanate, triphenyldimethylene triisocyanate, 4,4',4"-triphenylmethylene triisocyanate, 4,4'-dimethyl-diphenylmethane-2,2',5,5'-tetraisocyanate, tetraphenyltrimethylene tetraisocyanate, pentaphenyltetramethylene pentaisocyanate, and mixtures thereof.

30. The method of claim 23, wherein the polyfunctional compound has the structure

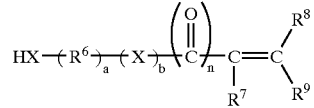

wherein each occurrence of X is —NH—, —O—, or —S—; $R^6$ is $C_1$–$C_{18}$ hydrocarbylene, optionally substituted with heteroatoms; $R^7$, $R^8$, and $R^9$ are independently hydrogen or $C_1$–$C_{18}$ hydrocarbyl; a is 0 or 1; b is 0 or 1; and n is 0 or 1.

31. The method of claim 23, wherein the polyfunctional compound is selected from vinyl alcohol, 2-hydroxyethyl (meth)acrylate, 2-hydroxypropyl (meth)acrylate, hydroxymethyl (meth)acrylate, N-hydroxymethyl (meth)acrylamide, polyethylene glycol (meth)acrylate, polypropylene glycol (meth)acrylate, hydroxystyrenes, hydroxymethylstyrenes, carboxystyrenes, hydroxyethyl vinyl ether, (meth)acrylic acid, and mixtures thereof.

32. The method of claim 23, wherein said reacting a poly(arylene ether) with a polyisocyanate compound and/or said reacting the urethane-capped poly(arylene ether) having pendant isocyanate functionality with a polyfunctional compound is conducted in the presence of a catalyst.

* * * * *

UNITED STATES PATENT AND TRADEMARK OFFICE
CERTIFICATE OF CORRECTION

PATENT NO. : 6,962,965 B2
DATED : November 8, 2005
INVENTOR(S) : Gary William Yeager It is certified that error appears in the above-identified patent and that said Letters Patent is hereby corrected as shown below:

Column 7,
Line 45, after "compound" delete "$R_{19}$" and insert -- $R^{19}$ --.

Column 8,
Line 1, after "compound" delete "$R_{20}$" and insert -- $R^{20}$ --.

Column 11,
Line 36, after "double" delete "bound" and insert -- band --.

Column 17,
Line 54, before "2" delete "addition" and insert -- additional --.

Column 18,
Line 31, after "according" insert -- to --.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,962,965 B2 Page 1 of 1
APPLICATION NO. : 10/783212
DATED : November 8, 2005
INVENTOR(S) : Gary William Yeager It is certified that error appears in the above-identified patent and that said Letters Patent is hereby corrected as shown below:

Title Page:
(73) Assignee, delete "Pittsfield, MA." and insert therefor -- Schenectady, NY --

Column 11:
Line 36, after "double" delete "bound" and insert therefor -- bond --

Signed and Sealed this

Fifth Day of February, 2008

JON W. DUDAS
*Director of the United States Patent and Trademark Office*